3,479,425
Patented Nov. 18, 1969

3,479,425
EXTRUSION METHOD
Lloyd Edward Lefevre, Bay City, and Peter Breidt, Jr., Midland, Mich., assignors to The Dow Chemical Company, Midland, Mich., a corporation of Delaware
Filed July 22, 1965, Ser. No. 474,094
Int. Cl. B32b 27/00
U.S. Cl. 264—171                                                                 6 Claims

ABSTRACT OF THE DISCLOSURE

A method is disclosed for the formation of simultaneously extruded laminar film wherein a composite stream consisting of coaxial streams of plastic is provided, passed to the sheeting die wherein the coaxial stream is deformed to provide a layered sheet.

---

Figure 1:
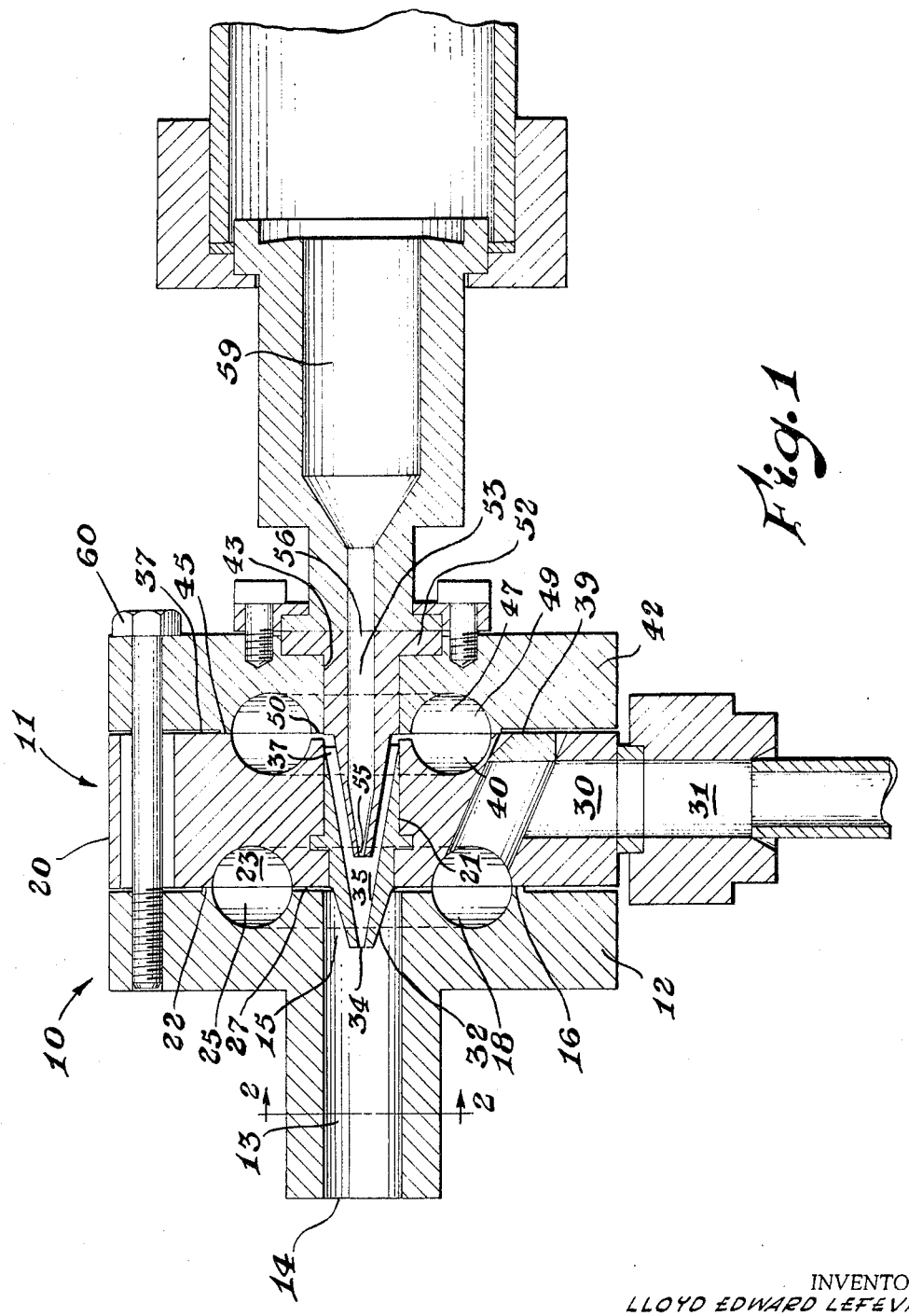

This invention relates to a method for extrusion and, more particularly, relates to a method for the coextrusion of two or more thermoplastic, resinous streams into a composite sheet having a plurality of parallel layers.

It is well known in the art that frequently it is desirable to prepare composite film or sheet from synthetic, resinous materials by the extrusion of these materials from a common die. Various forms of dies with internal slots beneficially may be employed to prepare such products where, in essence, slot dies are incorporated within slot dies and such slot dies fed by extruders providing material in the desired quantity and combination at appropriate temperatures. Such dies are relatively expensive, complex to make and in general are difficult to service.

It would be desirable if there were available a method which would permit the coextrusion or simultaneous extrusion of like or unlike polymeric materials in a layered form employing conventional extruders and conventional dies.

It would be further advantageous if there were available a method which would permit the coextrusion of a multilayer sheet or laminate from a conventional sheeting or film die which would provide a product having a generally uniform thickness to the various layers which make up such a product.

These benefits and other advantages are achieved in an apparatus for the practice of the method of the present invention, the apparatus comprising an extrusion adaptor which can be inserted between the discharge ends of at least two extruders and a sheeting die, the adaptor comprising a housing, the housing defining at least a first inlet and a second inlet, a first passageway and a second passageway, a first discharge and a second discharge, a first inlet and a second inlet and a first discharge being in communication by means of the first passageway, a second inlet and the second discharge being in communication by means of a second passageway, the first discharge and second discharge being generally coaxially arranged, wherein the first passageway generally surrounds at least a portion of the second passageway.

The method of the present invention comprises forming a composite multi-layer film comprising providing a first heat-plastified stream of a synthetic, resinous material, a second stream of a heat-plastified material disposing said second stream of heat plastified material within the first stream thereby encapsulating the second stream within the first stream to provide a composite stream having the material of the second stream coaxially disposed within the first stream.

Figure 2:
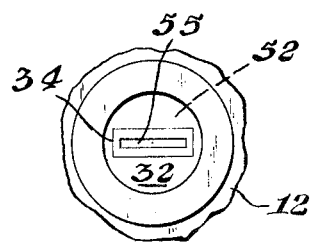
Figure 4:
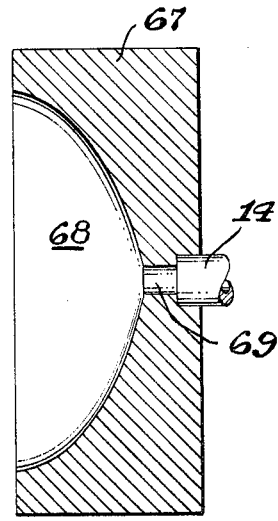
Figure 3:
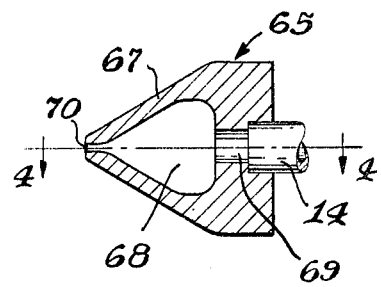
Figure 5:
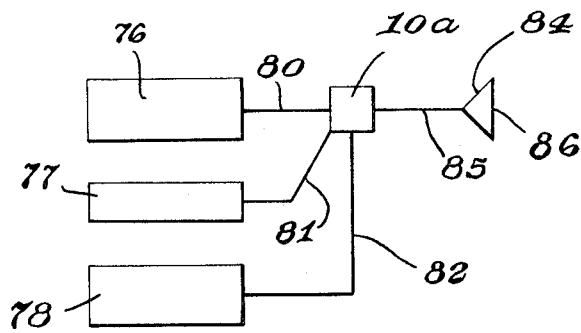
Figure 6:
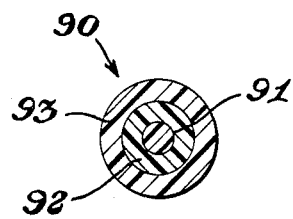

Further features and advantages of the invention will become more apparent from the following specification taken in connection with the drawing wherein:

FIGURE 1 is a sectional view of an apparatus in accordance with the invention;
FIGURE 2 is an end view of the apparatus of FIGURE 1 taken along the line 2—2 of FIGURE 1;
FIGURE 3 is a sectional view of a die suitable for use with the apparatus of FIGURE 1; and
FIGURE 4 is a sectional view of the die of FIGURE 3 taken along the line 4—4.
FIGURE 5 is a schematic reputation of apparatus of the invention in use.
FIGURE 6 is an alternate arrangement of feed flow.

In FIGURE 1 there is illustrated an apparatus generally designated by the reference numeral 10. The apparatus 10 comprises in cooperative combination a housing generally designated by the reference numeral 11. The housing 11 comprises a first body piece 12. The body piece 12 defines an internal cylindrical passageway 13 generally coaxial with the body 12. The passageway 13 has a discharge end 14 and an inlet end 15. The body portion 12 defines a generally radially extending surface 16 which defines a hemitoroidal recess 18. Adjacent to and in sealing engagement with the body portion 12 is a body portion 20. The body portion 20 defines an internal cylindrical passageway 21, a first radially extending surface 22 having defining therein a hemitoroidal passageway 23 adapted to mate with the hemitoroidal passage or groove 18 to form a toroidal plenum 25. The surfaces 16 and 22 adjacent the inlet end 15 of the passageway 13 of the body portion 12 define an annular radially extending passageway 27 providing communication between the toroidal passageway 25 and the cylindrical passageway 13. An inlet passageway 30 is defined by the body portion 20. The inlet passageway 30 terminates in one end at the toroidal plenum 25 and remote from the toroidal plenum. At a plastic supply means 31 disposed within the passageway 30 of the housing portion 20 is a bushing or die 32. The die 32 defines an elongate rectangular extrusion orifice 34 in communication with an internal cavity 35. The cavity 35 terminates in a generally cylindrical opening 37 remotely disposed from the elongate rectangular opening 34. The body portion 20 defines a generally radially extending surface 39 generally parallel to the surface 22 and remotely disposed therefrom. The surface 39 defines a hemitorodial annular cavity 40. A third body portion 42 is disposed adjacent the surface 39 of the second body portion 20. The third body portion 42 defines a generally centrally disposed cavity 43 which is in substantially coaxial relationship with the passageway 13 of the body portion 12 and the passageway 21 of the body 20. A generally radially extending surface 45 is defined by the body portion 42 and is adapted to engage in sealing engagement a portion of the surface 39 of the body portion 20. The surface 39 of the body portion 20 defines a hemitoroidal annular cavity 47 which is adapted to cooperate with the cavity 40 of the body portion 20 to define a second plenum 49 between the body portions 20 and 42. The surfaces 45 and 39 define a radially extending annular passageway 50 which provides communication between the passageway 37 and the second plenum 49. A bushing 52 is disposed within the passageway 43. The bushing 52 defines a centrally disposed passageway 53 which terminates in a generally rectangular extrusion orifice 55 disposed generally adjacent the bushing 32 and a generally circular opening 56 remote from the bushing 32. The circular opening 56 of the passageway 53 is in operative communication with a source 59 of heat-plastified, thermoplastic, synthetic, resinous material. The body portions 12, 20 and 42 are maintained in sealing engagement by the bolts 60 (one shown).

In FIGURE 2 there is illustrated a schematic end view of the apparatus 10 taken along the line 2—2 looking into the passageway 13 illustrating the relative location of the bushing 32 and its extrusion orifice 34 and showing the relationship of the extrusion orifice 55 of the bushing 52.

In FIGURE 3 there is illustrated one embodiment of a die generally designated by the reference numeral 65 which is suitable for use with the apparatus 10. The die 65 comprises a housing 67 having defined therein an internal cavity 68. A passage 69 provides communication between the cavity 68 and the exterior of the die 67. The cavity 68 terminates in an extrusion orifice 70 which is an elongate slot particularly suited for the extrusion of a sheet of material entering into the passage 69. The discharge end 14 is shown in sealing engagement with the die housing 67 or in communication with the passage 69.

FIGURE 4 depicts a view of the die 67 taken along the line 4—4 illustrating the relationship between the passageway 19, the cavity 68, and the extrusion orifice 70 defined by the housing 67.

In FIGURE 5 there is schematically illustrated an apparatus generally designated by the reference numeral 75. The apparatus 75 comprises a first extruder 76, a second extruder 77, a third extruder 78 or similar sources of heat-plastified, thermoplastic, resinous material. Extruders or polymer sources 76, 77, and 78 are in operative communication with a device 10a such as is illustrated in FIGURE 1 by means of the conduits 80, 81, and 82. The discharge portion of the device 10a is in communication with a sheeting die 84 by means of a conduit 85. The sheeting die 84 has an elongate extrusion orifice 86. The orifice 86 and the rectangular internal extrusion orifice such as orifices 34 and 58 are generally co-planar.

FIGURE 6 depicts a cross-sectional configuration of a stream generally designated by the reference numeral 90. The stream 90 comprises a first generally circular stream 91, a second generally circular stream 92 disposed about the first stream 91 and a third stream 93 of generally cylindrical form disposed about the stream 92.

The embodiment set forth in FIGURES 1–4 is particularly suited and adapted to produce composite sheet or film having exceptional uniformity of layer thickness from thermoplastic resinous extruded materials and compositions which tend to differ in melt viscosity at the temperatures at which they are extruded. The use of the inner rectangular orifice provides a substantial and significant increase in uniformity of distribution of material across the opening of the die.

In operation of the apparatus in the practice of the method of the present invention an apparatus such as the apparatus 10 is incorporated into an assembly such as 75 of FIGURE 5 wherein two or more sources of an extrudable material supply extrudable material to the appropriate supply passages of the device 10. A first extrudable material is supplied to the passageway 53 from which it is extruded through the orifice 55 as a rectangular or elongate stream. Extrudable material supplied to the passageway or plenum 49 flows about the bushing 52 and encapsulates the stream issuing therefrom. This composite stream is subsequently extruded from the orifice 34 in a rectangular configuration where it is encapsulated within a material supplied from a third polymer source to the plenum 25. Thus, the stream flowing in the passageway 13 has a configuration (assuming extrusion at constant linear velocity of all streams) generally identical to the configuration of the passage and orifices illustrated in FIGURE 2. Such a stream on entering a sheeting die, such as the die illustrated in FIGURES 3 and 4, maintains its layered configuration and the outer material supplied from plenum 25 through the annular passageway 27 is deformed from a circular configuration to a rectangular configuration as it moves toward the extrusion orifice 70. The deformation appears to occur largely in the exterior or circular stream in the conduit 13 and the extrudable materials of the inner stream or streams, maintains its configuration and is distributed generally uniformly across the width of the die. Beneficially the position of the inner layer and the relating thickness of the outer layers is readily altered by positioning the inner extrusion orifices such as orifice 34 in other than coaxial position relationship with the passage 13, this is readily accomplished by loosening the bolts 60 and respositioning the housing portion 20 radially and/or about the axis of the passageway 21.

As is readily apparent, the apparatus may be utilized for the preparation of sheeting having 1, 2 or 3 components therein, the number of components depending upon the number of streams fed into the apparatus such as the apparatus 10. If desired, housing portions such as the housing portion 20 may be added to the assembly to permit the preparation of film having 4, 5 or even more components as may be desired. The relative dimension of the various layers appearing in the extruded product is readily controlled within reasonable limits by varying the feed rate of the various polymer sources. For example, if it is desired to maintain a relatively thick inner layer, the material from the source 59 of FIGURE 1 would be supplied at a substantially higher rate than material from the plenum 49, thus providing a thick inner layer, a thin intermediate layer, and an outer layer proportional in thickness to the feed rate from the plenum 25. In extrusion of sheeting, it is necessary that a suitable temperature for extrusion be maintained for the material in the outer layer. The inner layer or layers may be extruded under conditions which would not normally result in a satisfactory product, as the surface finish of the sheet or film is dependent primarily upon the conditions employed for the extrusion of the outer layer. However, the temperatures of the material forming the inner layers must be sufficiently high to permit extrusion under reasonable pressures and rates. However, the normal temperature tolerance is substantially and significantly increased. Employing an apparatus substantially as shown in FIGURE 1 in cooperation with supplies of diverse polymeric material, multi-layer, thermoplastic, resinous film of several varieties is readily produced.

The embodiment of FIGURE 6, which is readily achieved by altering the orifice such as 34 and 55 to a circular configuration is generally employed when the flow viscosities of the various layers are relatively close. Oftentimes for many composite sheets, it is not essential that a uniform distribution of the diverse materials be obtained across the width of the sheet and the streams having generally concentric circular configuration is satisfactory. Two, three or more component multi-layer sheets are readily prepared using the essential coaxial feed arrangement depicted in FIGURE 6 with a wide variety of sheeting dies.

Generally it is advantageous to employ a sheeting die having an internal cavity which is deep relative to the width of the extrusion slot, in order that adequate spreading of the stream is obtained, however, satisfactory composite sheets have been prepared utilizing dies which are relatively short or shallow, that is the distance from the feed port to the die opening is short relative to the length of the extrusion orifice.

Employing the arrangement of the apparatus, including the embodiment of FIGURES 1–4 and also the feed arrangement as shown in FIGURE 6, satisfactory composite films and sheets have been prepared employing diverse combinations as polyethylene-polypropylene wherein the polypropylene is centrally disposed within the polyethylene, polyethylene encapsulating a vinylidene chloride-vinyl chloride polymer, polyethylene encapsulating polystyrene, polyethylene encapsulating a layer of a copolymer of 25 percent ethyl acrylate and 75 percent ethylene employed as adhesive which in turn encapsulates a copolymer of vinylidene chloride and vinyl chloride. The composite films and sheets prepared employing the embodiment of FIGURES 1–4 generally exhibit the most uniform distribution of material throughout the width of the sheet. Although the die illustrated in FIG- URES 3 and 4 is relatively deep, that is the distance from the die lips to the rear of the cavity, is greater relative to the width of the extrusion orifice, much shorter dies may be employed.

What is claimed is:

1. A method of forming a composite multilayer film, the steps of the method comprising
   providing a first heat plastified stream of a synthetic resinous material and a second stream of a heat plastified material,
   forming said first heat plastified stream into a generally elongate cross-sectional configuration,
   encapsulating said first stream within the second stream to provide a composite stream having the material of the second stream disposed in a generally cylindrical configuration about the centrally disposed elongate configuration of the first stream,
   supplying said composite stream to an extrusion die defining an elongate slot-like orifice,
   maintaining the elongate configuration of the first stream generally parallel to the elongate slot-like orifice of the die,
   forming and laterally expanding the composite stream into a generally elongate configuration,
   passing the composite stream from the extrusion orifice of the die, and
   subsequently cooling the composite stream below its thermoplastic resinous temperature.

2. A method of forming a composite multilayer film, the steps of the method comprising providing a
   first heat plastified stream of a synthetic, resinous material and a second stream of a heat plastified material,
   forming said first heat plastified stream into a generally rectangular elongate cross-sectional configuration,
   encapsulating said first stream within the second stream to provide a composite stream having the material of the second stream disposed in a generally circular cross-sectional configuration about the centrally disposed elongate rectangular configuration of the first stream,
   supplying said composite stream to an extrusion die defining an elongate slot-like orifice,
   maintaining the elongate rectangular configuration of the first stream generally parallel to the elongate slot-like orifice of the die,
   forming and laterally expanding the composite stream into a generally elongate configuration, and
   passing the composite stream from the extrusion orifice of the die and subsequently cooling the composite stream below its thermoplastic resinous temperature.

3. A method of forming a composite multilayer film comprising providing a first heat plastified stream of synthetic resinous material, a second stream of a heat plastified resinous material, forming said first heat plastified stream into a generally elongate configuration, encapsulating a first stream within the second stream to provide a composite stream having a material of the second stream disposed in a generally circular configuration about the centrally disposed elongate first stream, supplying said composite stream to an extrusion die defining an elongate slot-like orifice, maintaining the elongate configuration of the first stream generally parallel to the elongate slot-like orifice of the die, forming and laterally expanding the composite stream to a generally sheet-like configuration, passing the composite stream from the extrusion orifice of the die and subsequently cooling the composite stream below its thermoplastic temperature.

4. The method of claim 3 wherein the first stream is a vinylidene chloride polymer.

5. The method of claim 4 wherein the second stream is a polyolefin polymer such as polyethylene or polypropylene.

6. The method of claim 5 including the step of supplying a third stream of a heat plastified adhesive about the periphery of the first stream, the third stream adapted to adhere the polyolefin to the vinylidene chloride polymer.

References Cited

UNITED STATES PATENTS

| 3,321,804 | 5/1967 | Breidt et al. | 18—13 |
| 2,803,041 | 8/1957 | Hill et al. | 18—12 |
| 2,978,357 | 4/1961 | Fugazza | 264—173 |
| 3,189,941 | 6/1965 | Reifenhauser. | |
| 3,223,761 | 12/1965 | Raley | 264—95 |

FOREIGN PATENTS

| 985,310 | 3/1965 | Great Britain. |
| 652,955 | 11/1962 | Canada. |

ROBERT F. WHITE, Primary Examiner

JEFFERY R. THURLOW, Assistant Examiner

U.S. Cl. X.R.

18—13